(12) United States Patent
Matsuzaki (10) Patent No.: US 9,088,794 B2
(45) Date of Patent: Jul. 21, 2015

(54) MACROBLOCK SHUFFLING DEVICE, MACROBLOCK SHUFFLING METHOD, AND MACROBLOCK SHUFFLING PROGRAM

(75) Inventor: Tomonori Matsuzaki, Kobe (JP)

(73) Assignee: GVBB Holdings S.A.R.L., Luxembourg (LU)

( * ) Notice: Subject to any disclaimer, the term of this patent is extended or adjusted under 35 U.S.C. 154(b) by 334 days.

(21) Appl. No.: 13/380,502

(22) PCT Filed: Jun. 25, 2009

(86) PCT No.: PCT/JP2009/002926
§ 371 (c)(1),
(2), (4) Date: Jan. 24, 2012

(87) PCT Pub. No.: WO2010/150319
PCT Pub. Date: Dec. 29, 2010

(65) Prior Publication Data
US 2012/0134422 A1 May 31, 2012

(51) Int. Cl.
*H04N 11/02* (2006.01)
*H04N 11/04* (2006.01)
*H04N 7/12* (2006.01)
*H04N 19/119* (2014.01)
*H04N 19/176* (2014.01)
(Continued)

(52) U.S. Cl.
CPC ........... *H04N 19/119* (2014.11); *H04N 19/174* (2014.11); *H04N 19/176* (2014.11); *H04N 19/60* (2014.11); *H04N 19/88* (2014.11)

(58) Field of Classification Search
USPC .................................................. 375/240.24
See application file for complete search history.

(56) References Cited

U.S. PATENT DOCUMENTS

| 5,309,292 A | 5/1994 | Takakura |
| 5,535,275 A * | 7/1996 | Sugisaki et al. ............... 380/203 |

(Continued)

FOREIGN PATENT DOCUMENTS

| EP | 0499303 A2 | 8/1992 |
| JP | 2000324448 A | 11/2000 |

(Continued)

OTHER PUBLICATIONS

International Searching Authority, PCT International Search Report, mailed Mar. 3, 2010 for PCT Application No. PCT/JP2009/002926, European Patent Office, The Netherlands.

(Continued)

*Primary Examiner* — Chikaodili E Anyikire
(74) *Attorney, Agent, or Firm* — Arent Fox LLP (57) ABSTRACT

[Problem to be solved] To provide a shuffling device that can lower correlation between macroblocks by executing macroblock shuffling substantially equally to an image with an arbitrary size. [Means for solving the problem] A macroblock shuffling device, comprising: a pack creation portion that extracts and rearranges in order a macroblock from a screen on which a plurality of macroblocks constituting the image data are arranged, and creates a plurality of packs, each having a first predetermined number of or a second predetermined number smaller than the first predetermined number of the macroblocks; and a slice creation portion that extracts macroblocks one by one in order from each of the plurality of packs created by the pack creation portion and creates the same number as the first predetermined number of slices, each having a plurality of macroblocks.

15 Claims, 6 Drawing Sheets

(51) Int. Cl.
*H04N 19/60* (2014.01)
*H04N 19/174* (2014.01)
*H04N 19/88* (2014.01)

(56) References Cited

U.S. PATENT DOCUMENTS 6,108,487 A  8/2000  Takeda
2002/0071491 A1*  6/2002  Sugiyama et al. ....... 375/240.23

FOREIGN PATENT DOCUMENTS

| JP | 2002142193 A | 5/2002 |
| JP | 2005183869 A | 7/2005 |
| JP | 2008065629 A | 3/2008 |
| JP | 2011220696 A | 11/2011 |
| WO | WO-9114295 | 9/1991 |

OTHER PUBLICATIONS

Written Opinion in International Application No. PCT/JP2009/002926 mailed Mar. 3, 2010.
Notice of Reasons for Rejection dated Jun. 25, 2013 regarding Japan Application No. 2011-554285 (Japan application subsequently issued—Japan Patent No. 5443516, issue date—Dec. 27, 2013).
"Proposed SMPTE Standard for Television-Data Structure for DV-Based Audio, Data and Compressed Video-25 and 50 MB/S" SMPTE Journal, SMPTE Inc., Scarsdale, N.Y, vol. 108, No. 5, May 1, 1999, pp. 308-330 (XP000831859).
International Search Report for International Application No. PCT/JP2009/002926, mailed Mar. 3, 2010, 6 pages.

* cited by examiner

P ( i ) = Pack

| P ( 0 ) | M ( 0, 0 ) | M ( 0, 1 ) | M ( 0, 2 ) | ... | M ( 0, r −1 ) | ... | M ( 0, p−1 ) |
|---|---|---|---|---|---|---|---|
| P ( 1 ) | M ( 1, 0 ) | M ( 1, 1 ) | M ( 1, 2 ) | ... | M ( 1, r −1 ) | ... | M ( 1, p−1 ) |
| | | ... | ... | | | | |
| | | ... | ... | | | | |
| P ( q−2 ) | M ( q−2, 0 ) | M ( q−2, 1 ) | M ( q−2, 2 ) | ... | M ( q−2, r −1 ) | ... | M ( q−2, p−1 ) |
| P ( q−1 ) | M ( q−1, 0 ) | M ( q−1, 1 ) | M ( q−1, 2 ) | ... | M ( q−1, r −1 ) | | |
| | S ( 0 ) | S ( 1 ) | S ( 2 ) | | S ( r−1 ) | | S ( p−1 ) |

Fig. 5

S ( j ) = Slice

| S ( 0 ) | M ( 0, 0 ) | M ( 1, 0 ) | ... | M ( q−2, 0 ) | M ( q−1, 0 ) |
|---|---|---|---|---|---|
| S ( 1 ) | M ( 1, 0 ) | M ( 1, 1 ) | ... | M ( q−2, 1 ) | M ( q−1, 1 ) |
| | | ... | | | |
| | | ... | | | |
| S ( r −1 ) | M ( 0, r −1 ) | M ( 1, r −1 ) | ... | M ( q−2, r −1 ) | M ( q−1, r −1 ) |
| S ( r ) | M ( 0, r ) | M ( 1, r ) | ... | M ( q−1, r ) | |
| | | ... | | | |
| | | ... | | | |
| S ( p−1 ) | M ( 0, p−1 ) | M ( 1, p−1 ) | ... | M ( q−2, p−1 ) | |

| 1 | 5 | 8 | 2 | 4 | 3 | 6 | 7 | ......... | q |

Fig. 9

P'( i ) = Rearranged Pack

| P'( 0 )   | M'( 0, 0 )   | M'( 0, 1 )   | M'( 0, 2 )   | ... | M'( 0, r −1 )   | ... | M'( 0, p−1 )   |
|-----------|--------------|--------------|--------------|-----|-----------------|-----|----------------|
| P'( 1 )   | M'( 1, 0 )   | M'( 1, 1 )   | M'( 1, 2 )   | ... | M'( 1, r −1 )   | ... | M'( 1, p−1 )   |
|           |              | ...          | ...          |     |                 |     |                |
|           |              | ...          | ...          |     |                 |     |                |
| P'( q−2 ) | M'( q−2, 0 ) | M'( q−2, 1 ) | M'( q−2, 2 ) | ... | M'( q−2, r −1 ) | ... | M'( q−2, p−1 ) |
| P'( q−1 ) | M'( q−1, 0 ) | M'( q−1, 1 ) | M'( q−1, 2 ) | ... | M'( q−1, r −1 ) |     |                |

$$P'(i) = \text{reorder}[P(i)]$$
$$= \text{reorder}[M(i,0), M(i,1), M(i,2), ... M(i,r-1) ..., M(i,p-1)]$$
$$= M'(i,0), M'(i,1), M'(i,2), ... M'(i,r-1) ..., M'(i,p-1)$$

Fig. 10

| MB( 0, 0 ) | MB( 0, 1 ) | MB( 0, 2 ) | MB( 1, 0 ) | MB( 1, 1 ) | MB( 1, 2 ) | MB( 2, 0 ) | MB( 2, 1 ) |
|------------|------------|------------|------------|------------|------------|------------|------------|
| MB( 0, 3 ) | MB( 0, 4 ) | MB( 0, 5 ) | MB( 1, 3 ) | MB( 1, 4 ) | MB( 1, 5 ) | MB( 2, 2 ) | MB( 2, 3 ) |
| MB( 2, 4 ) | MB( 2, 5 ) | MB( 3, 0 ) | MB( 3, 4 ) | MB( 3, 5 ) | MB( 4, 0 ) | MB( 4, 4 ) | MB( 4, 5 ) |
| MB( 3, 1 ) | MB( 3, 2 ) | MB( 3, 3 ) | MB( 4, 1 ) | MB( 4, 2 ) | MB( 4, 3 ) | MB( 5, 0 ) | MB( 5, 1 ) |
| MB( 5, 0 ) | MB( 5, 1 ) | MB( 5, 2 ) | MB( 5, 3 ) | MB( 6, 0 ) | MB( 6, 1 ) | MB( 6, 2 ) | MB( 6, 3 ) |

Fig. 11

| P( 0 ) = | M( 0, 0 ) | M( 0, 1 ) | M( 0, 2 ) | M( 0, 3 ) | M( 0, 4 ) | M( 0, 5 ) |
|----------|-----------|-----------|-----------|-----------|-----------|-----------|
| P( 1 ) = | M( 1, 0 ) | M( 1, 1 ) | M( 1, 2 ) | M( 1, 3 ) | M( 1, 4 ) | M( 1, 5 ) |
| P( 2 ) = | M( 2, 0 ) | M( 2, 1 ) | M( 2, 2 ) | M( 2, 3 ) | M( 2, 4 ) | M( 2, 5 ) |
| P( 3 ) = | M( 3, 0 ) | M( 3, 1 ) | M( 3, 2 ) | M( 3, 3 ) | M( 3, 4 ) | M( 3, 5 ) |
| P( 4 ) = | M( 4, 0 ) | M( 4, 1 ) | M( 4, 2 ) | M( 4, 3 ) | M( 4, 4 ) | M( 4, 5 ) |
| P( 5 ) = | M( 5, 0 ) | M( 5, 1 ) | M( 5, 2 ) | M( 5, 3 ) | M( 5, 4 ) | M( 5, 5 ) |
| P( 6 ) = | M( 6, 0 ) | M( 6, 1 ) | M( 6, 2 ) | M( 6, 3 ) |           |           |

Fig. 12

| S( 0 ) = | M( 0, 0 ) | M( 1, 0 ) | M( 2, 0 ) | M( 3, 0 ) | M( 4, 0 ) | M( 5, 0 ) | M( 6, 0 ) |
|----------|-----------|-----------|-----------|-----------|-----------|-----------|-----------|
| S( 1 ) = | M( 0, 1 ) | M( 1, 1 ) | M( 2, 1 ) | M( 3, 1 ) | M( 4, 1 ) | M( 5, 1 ) | M( 6, 1 ) |
| S( 2 ) = | M( 0, 2 ) | M( 1, 2 ) | M( 2, 2 ) | M( 3, 2 ) | M( 4, 2 ) | M( 5, 2 ) | M( 6, 2 ) |
| S( 3 ) = | M( 0, 3 ) | M( 1, 3 ) | M( 2, 3 ) | M( 3, 3 ) | M( 4, 3 ) | M( 5, 3 ) | M( 6, 3 ) |
| S( 4 ) = | M( 0, 4 ) | M( 1, 4 ) | M( 2, 4 ) | M( 3, 4 ) | M( 4, 4 ) | M( 5, 4 ) |           |
| S( 5 ) = | M( 0, 5 ) | M( 1, 5 ) | M( 2, 5 ) | M( 3, 5 ) | M( 4, 5 ) | M( 5, 5 ) |           |

MACROBLOCK SHUFFLING DEVICE, MACROBLOCK SHUFFLING METHOD, AND MACROBLOCK SHUFFLING PROGRAM

CROSS-REFERENCE TO RELATED APPLICATIONS

This application is a United States National Stage Application under 35 U.S.C. §371 of International Patent Application No. PCT/JP2009/002926, filed Jun. 25, 2009, which is incorporated by reference into this application as if fully set forth herein.

TECHNICAL FIELD

The present invention relates to a macroblock shuffling device, a macroblock shuffling method, and a macroblock shuffling program.

BACKGROUND ART

In the technology of digitally processing moving image data having an enormous amount of information, it is required to perform highly efficient compression processing.

Figure 13:
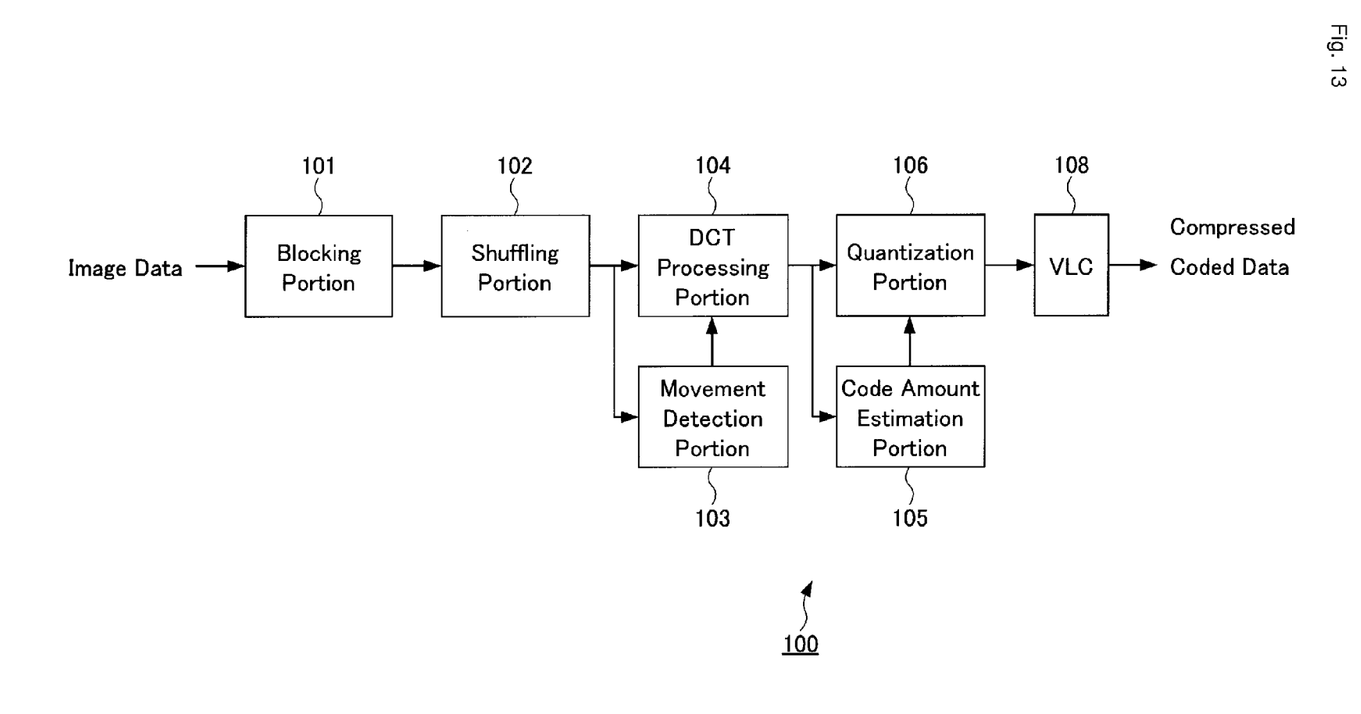
FIG. 13 is a diagram showing an example of a functional configuration of an image coding device.

FIG. 13 shows an example of an image coding device. As shown in FIG. 13, an image coding device 100 includes: a blocking portion 101 that creates a macroblock of 8*8, which is a basic unit of DCT (Discrete Cosine Transform) by executing block processing when moving image data is input; a shuffling portion 102 that collects a predetermined number of macroblocks created by the blocking portion 101 and shuffles the macroblocks in a unit of slices so as to make amounts of information consistent; a movement detection portion 103 that detects movement of the macroblock; a DCT processing portion 104 that executes weight processing by way of DCT conversion of the shuffled block for each slice on the basis of the movement detected by the movement detection portion 103; a code amount estimation portion 105 that estimates a code amount by classifying the blocks processed by the DCT processing portion 104; a quantization portion 106 that quantizes the blocks according to the code amount estimated by the code amount estimation portion 105; and a variable length coding (VLC) portion 108 that variable-length codes the slice quantized by the quantization portion 106 and outputs compressed coded data obtained by compressing an amount of information with high efficiency.

Since the macroblocks continuously created at the blocking portion 101 and output directly reflect photographed image information, a correlation is generated between adjacent macroblocks, and an error amount or data amount contained in the individual macroblocks may be concentrated in some macroblock groups. With the purpose of preventing propagation of such data error or improving a processing speed realized by dividing the processing into a plurality of processing units and simultaneously processing them with a plurality of computing units, processing may be divided into a plurality of processing units and executed in some cases even if a single image is to undergo compression processing. A processing unit capable of such independent processing is referred to as a "slice". Thus, the shuffling portion 102 executes shuffling processing in which a spatial position of a macroblock is moved from an original position by the unit of slice obtained by collecting a plurality of macroblocks and shuffling. In this way, the correlation between the macroblocks is lowered and the data amounts between the macroblocks are evenly distributed while at the same time a concentration of an error in some macroblock groups is prevented.

The shuffling processing executed by the shuffling portion 102 conforms to the DV standard, which is a standard of digital video published by the HD Digital VCR Conference mainly for household use (See Non-patent Literatures 1 and 2). The shuffling method specified by the DV standard assumes images of predetermined sizes, namely, 720*480, 720*576, 960*720, 1280*1080, and 1440*1080. Moreover, although the shuffling portion 102 divides the image into super blocks and extracts a predetermined number of macroblocks for each super block and rearranges them, the size of the super block divided from the image is also specified.

Figure 14:
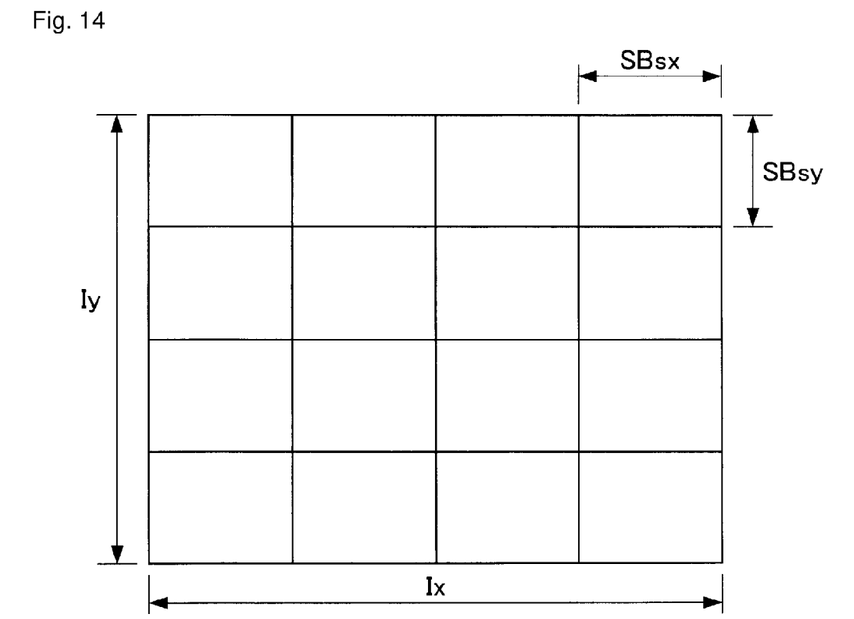
FIG. 14 is a diagram showing an example of a super block into which an image is divided by the conventional macroblock shuffling method.

FIG. 14 shows a structure of image data whereby the shuffling portion 102 performs shuffling according to the DV standard. Ix indicates the number of macroblocks in the horizontal direction, while Iy indicates the number of macroblocks in the vertical direction. Furthermore, the number of macroblocks in the horizontal direction in the super block divided by the shuffling portion is referred to as SBsx, and the number of macroblocks in the vertical direction in the super block as SBsy. As is evident from FIG. 14, due to the size of image processed by the shuffling portion 102 is specified, the size of the super block to be divided can also be equally allocated into SBsx in the horizontal direction and SBsy in the vertical direction.

CITATION LIST

Non Patent Literature

NPL 1: SMPTE314M-1999 "Data Structure for DV-Based Audio, Data and Compressed Video—25 and 50 Mb/s"
NPL 2: SMPTE370M-2002 "Data Structure for DV-Based Audio, Data and Compressed Video at 100 Mb/s—1080/60i, 1080/50i, 720/60p"

SUMMARY OF INVENTION

Technical Problem

However, since the shuffling method provided by the DV standard specifies the applicable image sizes as 720*480, 720*576, 960*720, 1280*1080, and 1440*1080, the shuffling can not be applied to an image with a size not provided by the DV standard. Moreover, if the shuffling processing is to be executed for an image with an arbitrary size, there may be a case in which a super block having the number of macroblocks in the horizontal direction and the number of macroblocks in the vertical direction equally divided into SBsx and SBsy can not be created with the image data as in the case shown in FIG. 14. In the DV standard, since the macroblocks to be shuffled are extracted for each super block, if the number of macroblocks contained in the super block is not equal, the shuffling can not be executed equally.

Moreover, if there is regularity in the shuffling for spatially moving the macroblock from the original position to another position, correlation can be generated between the macroblocks after the shuffling with a predetermined interval. Therefore, if the shuffling processing is simplified in order to apply it to an image with an arbitrary size, the data amount or error amount contained in the macroblock is changed with a predetermined interval and regularity, which may cause deterioration in image quality. Therefore, in the case of unique codec processing for editing, for example, it is extremely difficult to execute efficient shuffling of the macroblocks for an image with arbitrary size not assumed by the DV standard.

The present invention was conceived in order to solve the conventional problems and has an object thereof to provide a shuffling device, a macroblock shuffling method, and a macroblock shuffling program that can lower correlation between macroblocks by executing macroblock shuffling substantially equally to an image with an arbitrary size.

Solution to Problem

In accordance with a first aspect of the present invention, there is provided a macroblock shuffling device constituting an image coding device for coding image data, including a pack creation portion that extracts a macroblock from a screen on which a plurality of macroblocks constituting the image data are arranged and rearranges it in order, and creates a plurality of packs, each having a first predetermined number of or a second predetermined number smaller than the first predetermined number of the macroblocks, and a slice creation portion that extracts macroblocks one by one in order from each of the plurality of packs created by the pack creation portion and creates the same number as the first predetermined number of slices, each having a plurality of macroblocks, in which the pack creation portion divides the total number of the macroblocks contained in the image data by the number of packs so as to make a quotient thereof the first predetermined number, and in a case where there is no remainder, the pack is created so that the second predetermined number becomes equal to the first predetermined number, while in a case where there is a remainder, the remainder is made the second predetermined number, and the pack is created so that only one pack has the second predetermined number of macroblocks, and the slice creation portion extracts the plurality of macroblocks contained in each of the slices from different packs, respectively.

With the purpose of preventing propagation of data errors or improving processing speed realized by dividing the processing into a plurality of processing units and simultaneously processing thereof with a plurality of computing units, processing may be divided into a plurality of processing units and executed even in a case where a single image is given compression processing in some cases. A processing unit capable of such independent processing is referred to as a "slice", herein. Unless particularly specified, the above also applies to the claims and description of the present application. When data of a single image is divided into a plurality of slices, if the image is simply divided by sequentially arranging and allocating the slices in order from the end of the image, since an image may have an area such as a blue sky where the amount of information is small and an area such as a small character group where the amount of information is large, there may be variation in processing loads between the slices depending on the contents of the image. Then, by rearranging the macroblocks, that is, shuffling so as to evenly extract macroblocks to be allocated to each slice from spatially discrete areas, the amounts of information between slices are made consistent. As mentioned above, by making the amounts of information consistent between the slices, rate control is facilitated, and an effect to evenly distribute a load in decoding can be anticipated. In the macroblock shuffling device according to the present invention, the pack creation portion divides the total number of macroblocks contained in the image data by the number of packs so that the quotient thereof becomes a first predetermined number and in a case where there is a remainder, the remainder is made a second predetermined number and only one pack has the second predetermined number of macroblocks, while in a case where there is no remainder, the pack is created so that the second predetermined number becomes equal to the first predetermined number. Thus, the number of macroblocks contained in the pack becomes the same except for the one pack even for an image of a size with which the macroblocks cannot be divided evenly into the number of packs. The slice creation portion sequentially extracts the macroblocks one by one from each of the plurality of packs created by the pack creation portion so that the same number as the first predetermined number of slices are created, each having the plurality of macroblocks, and the slice creation portion extracts the plurality of macroblocks contained in each of the slices from different packs. Thus, even for an image of a size with which the macroblocks cannot be divided evenly into the number of packs, a difference in the number of macroblocks contained in each of the plurality of created slices results in the difference in the numbers of the macroblocks between the slice to which the second predetermined number of macroblocks contained only in one pack is allocated and the slice not allocated, that is, only one. Therefore, the macroblock shuffling device according to the present invention can lower the correlation between the macroblocks by executing the shuffling substantially equally even for an image of arbitrary size. In addition, if the correlation between the macroblocks is lowered by the shuffling, since a quantization value between the slices gets close, an effect can also be expected in that a speed of quantization can be raised and quality of a single image can easily be made consistent. As mentioned above, the macroblock shuffling device according to the present invention divides into a plurality of slices so as to reduce bias in the information amount, even for an image of arbitrary size by devising a shuffling method.

Furthermore, according to the present invention, the macroblock shuffling device may include a super-block dividing portion that divides a screen on which a plurality of macroblocks constituting the image data into a plurality of super blocks and classifies the plurality of macroblocks for each super block, in which the pack creation portion may be configured so that the macroblock is extracted for each of the super blocks according to a predetermined function and allocated one by one to each of the plurality of packs.

With the above configuration, in the macroblock shuffling device according to the present invention, since the pack creation portion can extract a macroblock for each of the super blocks according to the predetermined function and sequentially allocate thereof to each one of the plurality of packs, in addition to the above features, the correlation between the macroblocks can be lowered by efficiently executing the macroblock shuffling to be substantially consistent for an image of arbitrary size.

Moreover, according to the present invention, the pack creation portion may switch the order of the macroblocks at random when the macroblock is extracted for each of the super blocks.

In the shuffling processing to spatially move a macroblock from an original position to another position, if some regularity exists, a correlation might be generated between the macroblocks after the shuffling with a predetermined interval. With the above configuration, the macroblock shuffling device according to the present invention can further lower the correlation between the macroblocks after the shuffling.

Furthermore, according to the present invention, the plurality of super blocks divided by the super-block dividing portion may be represented in a rectangular form, respectively, and made up of a first super-block group of super-blocks equal to one another in the number of vertically arranged macroblocks and the number of horizontally arranged macroblocks; a second super-block group of super-blocks respectively equal to the super-blocks of the first super-block group in the number of vertically arranged macroblocks but different from the super-blocks of the first super-block group in the number of horizontally arranged macroblocks; a third super-block group of super-blocks respectively equal to the super-blocks of the first super-block group in the number of horizontally arranged macroblocks but different from the super-blocks of the first super-block group in the number of vertically arranged macroblocks; and a fourth super-block group of super-blocks respectively equal to the super-blocks of the second super-block group in the number of horizontally arranged macroblocks and equal to the super-blocks of the third super-block group in the number of vertically arranged macroblocks, and the pack creation portion may extracts a macroblock for each of the super blocks horizontally from above in order and sequentially allocate the macroblock to each one of the plurality of packs.

With the above configuration, the macroblock shuffling device according to the present invention can lower the correlation between the macroblocks by executing the shuffling to be substantially consistent, even for an image of arbitrary size.

In accordance with a second aspect of the present invention, there is provided a macroblock shuffling method constituting an image coding process for coding image data, comprising: a pack creation step of extracting a macroblock from a screen on which a plurality of macroblocks constituting the image data are arranged and rearranging it in order, and creating a plurality of packs, each having a first predetermined number of or a second predetermined number smaller than the first predetermined number of the macroblocks; and a slice creation step of extracting macroblocks one by one in order from each of the plurality of packs created by the pack creation step and creating the same number as the first predetermined number of slices, each having a plurality of macroblocks, wherein, the pack creation step has a step of dividing the total number of the macroblocks contained in the image data by the number of packs so as to make a quotient thereof the first predetermined number, and in a case where there is no remainder, the pack is created so that the second predetermined number becomes equal to the first predetermined number, while in a case where there is a remainder, the remainder is made the second predetermined number, and the pack is created so that only one pack has the second predetermined number of macroblocks, and the slice creation step has a step of extracting the plurality of macroblocks contained in each of the slices from different packs, respectively.

With the above configuration, the macroblock shuffling method according to the present invention can lower the correlation between the macroblocks by executing the macroblock shuffling to be substantially consistent even for an image of arbitrary size.

In accordance with a third aspect of the present invention, there is provided a macroblock shuffling program executable by a computer to carry out a macroblock shuffling process constituting an image coding process for coding image data, the macroblock shuffling process comprising: a pack creation step of extracting a macroblock from a screen on which a plurality of macroblocks constituting the image data are arranged and rearranging it in order, and creating a plurality of packs, each having a first predetermined number of or a second predetermined number smaller than the first predetermined number of the macroblocks; and a slice creation step of extracting macroblocks one by one in order from each of the plurality of packs created by the pack creation step and creating the same number as the first predetermined number of slices, each having a plurality of macroblocks, wherein, the pack creation step has a step of dividing the total number of the macroblocks contained in the image data by the number of packs so as to make a quotient thereof the first predetermined number, and in a case where there is no remainder, the pack is created so that the second predetermined number becomes equal to the first predetermined number, while in a case where there is a remainder, the remainder is made the second predetermined number, and the pack is created so that only one pack has the second predetermined number of macroblocks, and the slice creation step has a step of extracting the plurality of macroblocks contained in each of the slices from different packs, respectively.

With the above configuration, the macroblock shuffling program according to the present invention can cause a computer to execute a process which lowers the correlation between the macroblocks by executing the macroblock shuffling to be substantially consistent even for an image of arbitrary size.

Advantageous Effects of Invention

According to the present invention, the correlation between the macroblocks can be lowered, and thus, deterioration in image quality is prevented by executing the macroblock shuffling to be substantially consistent even for an image of arbitrary size.

REFERENCE SIGNS LIST

1 Macroblock shuffling device
3 Super block dividing portion
4 Pack creation portion
5 Slice creation portion
101 Blocking portion
102 Shuffling portion
103 Motion detection portion
104 DCT processing portion
105 Code amount estimation portion
106 Quantization portion
108 VLC

DESCRIPTION OF EMBODIMENTS

A specific embodiment of the present invention will be described in detail referring to the accompanying drawings.

First, a macroblock shuffling device of an embodiment of the present invention will be described referring to FIG. 1. In the present embodiment, a unit for which the shuffling is executed is referred to as a "slice". It should be noted that a video shuffling device of the present embodiment can also be applied as a shuffling portion 102 of an image coding device shown in FIG. 13, and in addition, the device can also be applied to inter-frame compression as well as various kinds of video compression including unique codec for editing and DV standard, and intra-frame compression.

Figure 1:
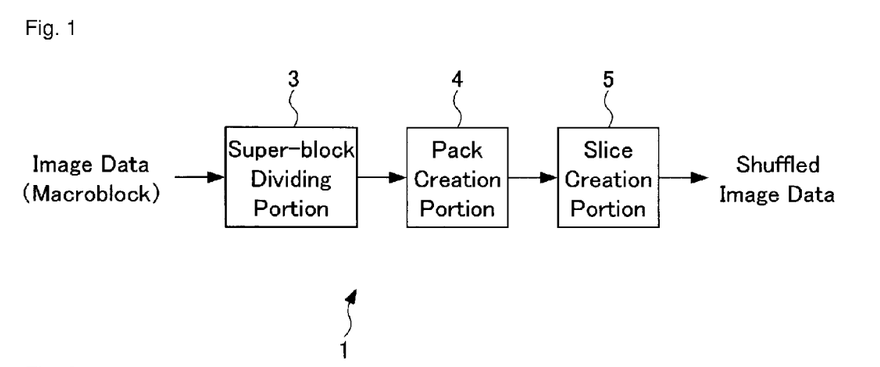
FIG. 1 is a block diagram showing a functional configuration of a macroblock shuffling device of an embodiment of the present invention.

As shown in FIG. 1, a macroblock shuffling device 1 of the present embodiment includes a super-block dividing portion 3 for inputting image data and dividing a screen on which a plurality of macroblocks constituting the image data are arranged into a plurality of super blocks, and classifying the plurality of macroblocks into each super block, a pack creation portion 4 for extracting and rearranging the macroblocks for each of the super blocks divided by the super-block dividing portion 3 and creating a plurality of packs, each having a first predetermined number of or a second predetermined number smaller than the first predetermined number of the macroblocks, and a slice creation portion 5 for extracting the macroblock one by one in order from each of the plurality of packs created by the pack creation portion 4 and creating the same number as the first predetermined number of slices, each having a plurality of macroblocks. Here, the pack creation portion 4 divides the total number of the macroblocks contained in the image data by the number of packs so as to make the quotient thereof the first predetermined number, and in a case where there is a remainder, the remainder is made the second predetermined number, and the pack is created so that only one pack has the second predetermined number of macroblocks, while in a case where there is no remainder, the pack is created so that the second predetermined number becomes equal to the first predetermined number. The slice creation portion 4 extracts the plurality of macroblocks contained in each of the slices from different packs, respectively.

Figure 2:
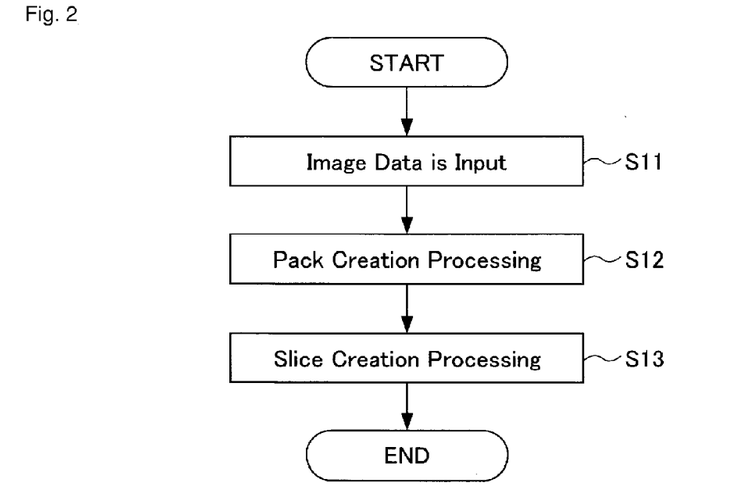
FIG. 2 is a flowchart illustrating an operation executed by the macroblock shuffling device of the embodiment of the present invention.

A basic operation of the macroblock shuffling device 1 will be described referring to a flowchart shown in FIG. 2. The operation of the macroblock shuffling device 1 is controlled by a processing means such as CPU, not shown. First, when the super-block dividing portion 3 inputs image data (S11), the pack creation portion 4 extracts and rearranges the macroblocks constituting the image data so as to create a plurality of packs, each having the first predetermined number or the second predetermined number smaller than the first predetermined number of the macroblocks (S12). The slice creation portion 5 extracts the macroblock one by one in order from each of the plurality of packs created by the pack creation portion 4 and creates the same number as the first predetermined number of slices, each having the plurality of macroblocks. Here, the pack creation portion 4 divides the total number of the macroblocks contained in the image data by the number of packs so as to make the quotient thereof the first predetermined number, and in a case where there is a remainder, the remainder is made the second predetermined number and the pack is created so that only one pack has the second predetermined number of macroblocks, while in a case where there is no remainder, the pack is created so that the second predetermined number becomes equal to the first predetermined number. The slice creation portion 4 extracts the plurality of macroblocks contained in each of the slices from different packs, respectively. First, pack creation processing for creating a pack executed by the pack creation portion 4 will be described.

<Pack Creation Processing>

Figure 3:
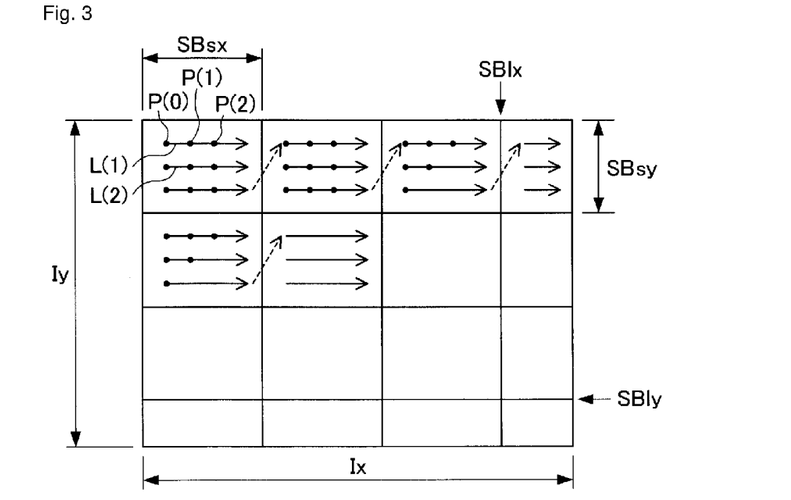
FIG. 3 is a diagram illustrating an outline of processing executed by the macroblock shuffling device shown in FIG. 1 for extracting a macroblock for each super block and allocating thereof to a pack.

FIG. 3 shows an example of a super block divided by the super-block dividing portion 3. Ix refers to the number of macroblocks in the horizontal direction of the image, while Iy refers to the number of macroblocks in the vertical direction of the image, and the number of packs created by the pack creation portion 4 is referred to as q. Although the number of packs is set to 5 in the conventional DV standard, in the present embodiment, the number is preferably close to the number of macroblocks to be contained in a single slice and is preferably around 20 to 30, for example, depending on implementation such as buffer size or CPU performance.

Moreover, in the present embodiment, since the size of the image data to be processed is arbitrary, in the super block divided by the super-block dividing portion 3 (FIG. 1), as shown in FIG. 3, in the super block at the right end, a number of macroblocks which should be located at the right end may be missing or in the super block at the lower end, a number of macroblocks which should be located at the lower end might be missing.

More specifically, if the total number of macroblocks contained in the image, $Ix*Iy$, is divided by the number of the packs, q, there may be a remainder. Thus, supposing that the number of macroblocks contained in the horizontal direction in each of the basic super blocks divided by the shuffling portion 102 (FIG. 13) is SBsx, the number of macroblocks contained in the vertical direction is SBsy, a position at the left end of the super block with the missing right end is SB1x, and a position at the lower end of the super block with the missing lower end is SB1y.

In other words, if each of the plurality of super blocks divided by the super-block dividing portion 3 is represented in a rectangular shape, they are divided into a first super-block group, a second super-block group, a third super-block group, and a fourth super-block group. The first super-block group in which the number of macroblocks arranged horizontally and the number of macroblocks arranged vertically are equal to SBsx and SBsy. The second super-block group in which the number of macroblocks arranged vertically is SBsy and equal to that in each of the super blocks in the first super-block group, but the number of macroblocks arranged horizontally is different from SBsx. The third super-block group in which the number of macroblocks arranged horizontally is SBsx and equal to that in each of the super blocks in the first super-block group, but the number of macroblocks arranged vertically is different from SBsy. The fourth super-block group in which the number of macroblocks arranged horizontally is equal to the super blocks in the second super-block group and the number of macroblocks arranged vertically is equal to the super blocks in the third super-block group. In addition, according to the present invention, values such as SBsx, SBsy, SB1x and SB1y do not necessarily have to be associated with the number of packs, q.

The pack creation portion 4 sequentially extracts the macroblocks from each of the super blocks created as above in the lateral direction from above and rearranges them, and in a case where the total Ix*Iy is divisible by the number of packs, q, q pieces of the packs are created, each having the same number of the macroblocks as the quotient calculated by dividing the total number of macroblocks, Ix*Iy, by the number of packs, q, while in a case where the total Ix*Iy is not divisible by the number of packs, q, the q−1 pieces of packs, each having the same number of the macroblocks as the quotient calculated by dividing the total of macroblocks, Ix*Iy, by the number of packs, q, and one pack having the same number of macroblocks as the remainder calculated by dividing the total of macroblocks, Ix*Iy, by the number of packs, q, are created.

An outline of the processing in which the pack creation portion 4 (FIG. 1) creates packs will be described referring to FIG. 3. As shown in FIG. 3, the pack creation portion 4 extracts the macroblocks contained in the super block for each row from up to down in order of L(1), L(2), . . . L(i), . . . one by one from left to right in the horizontal direction and continues allocation processing into the packs P(0), P(1), P(2) . . . . Here, i is an integer. When this processing is finished for one super block, the processing moves to the adjacent super block to the right and executes the same processing. In this manner processing is continued from the left super block to the right super block in the horizontal direction, and when this processing is finished for the super-block group in the upper stage, similar processing is continued for the super-block group in the lower stage. As mentioned above, the macroblocks are extracted from all the super blocks and allocated to the packs without duplication in this fashion.

Figure 4:
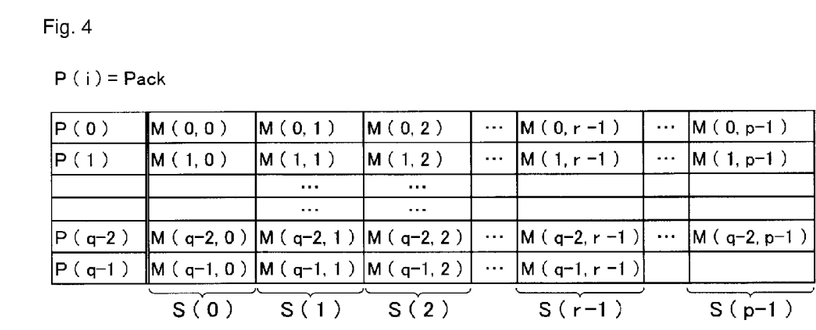
FIG. 4 is a diagram showing an example of packs created by the macroblock shuffling device shown in FIG. 1.

FIG. 4 shows an example of a pack created in this way. Here, P(i) indicates the i-th pack and M(i, j) indicates the j-th macroblock contained in the i-th pack. As shown in FIG. 4, q pieces of the packs have been created, and the number of macroblocks contained in the pack is p for the packs of P(0) to P(q−2) and r for the pack of P(q−1), which is the last pack. Here, the value p is the quotient obtained by dividing the total Ix*Iy by the number of packs, q, while the value r is the remainder obtained by dividing the total Ix*Iy by the number of packs. Therefore, r is not more than p, and if the total Ix*Iy is divisible by the number of packs, q, r becomes equal to p. The shuffling device 1 of the present embodiment can handle image data of an arbitrary size. Therefore, there is no need for r to be the same as p. The pack creation processing of creating the slice executed by the slice creation portion 5 (FIG. 1) on the basis of the pack created as above will be described below.

<Slice Creation Processing>

The slice creation portion 5 (FIG. 1) sequentially extracts the macroblocks one by one from each of the packs P(0) to P(q−1) created as above and creates the same number of slices S(0) to S(p−1) as the quotient p obtained by dividing the total Ix*Iy by the number of the packs, q, each having a plurality of macroblocks. The slice creation portion 5 (FIG. 1) extracts the plurality of macroblocks contained in each of the slices S(0) to S(p−1) from different packs P(0) to P(q−1) without duplication.

Figure 5:
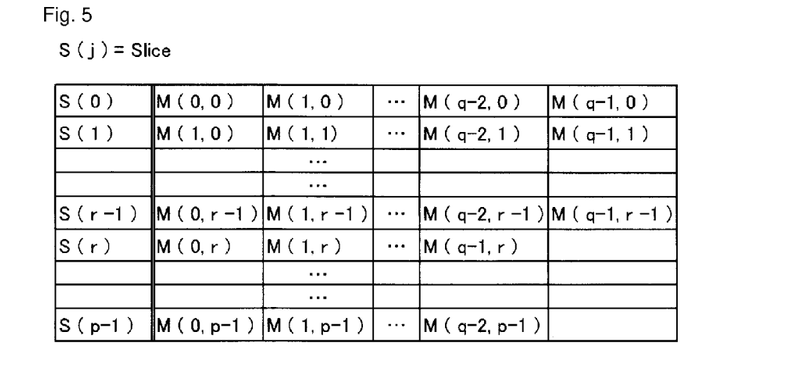
FIG. 5 is a diagram showing an example of slices created by the macroblock shuffling device shown in FIG. 1.

FIG. 5 shows an example of a slice created by the slice creation portion 5. As shown in FIG. 5, the slice creation portion 5 allocates the macroblocks from each of the packs P(0) to P(q−1) in a distributed manner so that the macroblocks belonging to the same pack are not contained in the same slice in duplication and sequentially creates the slices S(0) to S(p−1). For example, as shown in FIG. 4, the slices S(0) to S(p−1) may be created by extracting the macroblocks one by one in the vertical direction from each of the packs P(0) to P(q−1).

Therefore, the number of slices created by the slice creation portion 5 (FIG. 1) matches the maximum number p among the numbers of the macroblocks contained in each of the packs. As shown in FIG. 5, the number of macroblocks contained in each of the packs created by the pack creation portion 4 is p for the packs P(0) to P(q−2) and r for the pack P(q−1). Therefore, the number of slices created by the slice creation portion 5 is p. In addition, the number of macroblocks contained in the slice is q or (q−1).

In this way, even for an image of a size with which the macroblocks cannot be allocated to the number of packs evenly, a difference in the number of macroblocks contained in each of the plurality of created slices is equal to the difference in the number of macroblocks between the slice to which the second predetermined number of macroblocks contained only in one pack are allocated and the slice not allocated, that is, only one. Therefore, the macroblock shuffling device according to the present invention can lower the correlation between the macroblocks and prevent deterioration in image quality by executing the shuffling to be substantially consistent, even for an image of arbitrary size.

<Correlation Elimination>

Figure 6:
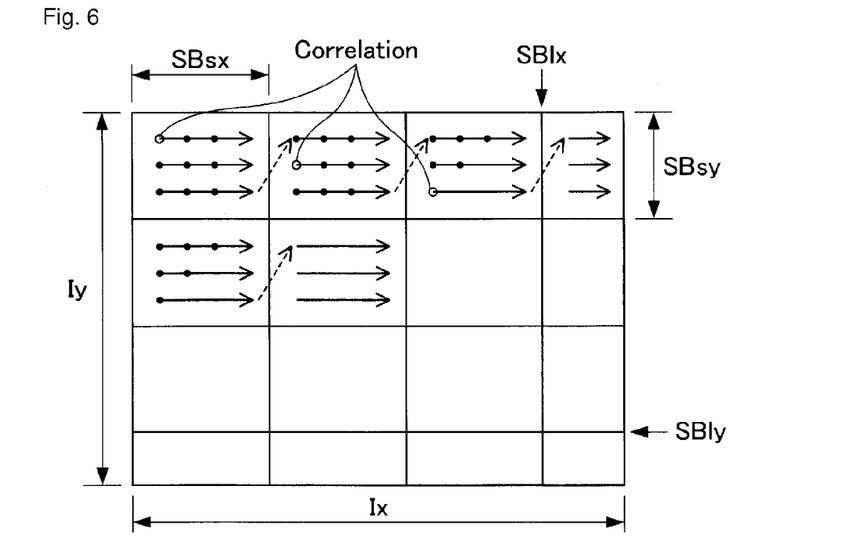
FIG. 6 is a diagram illustrating regularity which may be generated in shuffling of the macroblocks.

Moreover, in the shuffling processing to spatially move a macroblock from an original position to another position, if regularity exists, as shown in FIG. 6, correlation might be generated between the macroblocks after the shuffling (marked with a circle) with a predetermined interval. Thus, the pack creation portion 4 may rearrange the order of macroblocks as randomly as possible when extracting the macroblocks from the image data and rearrange them so as to create the pack.

Figure 7:
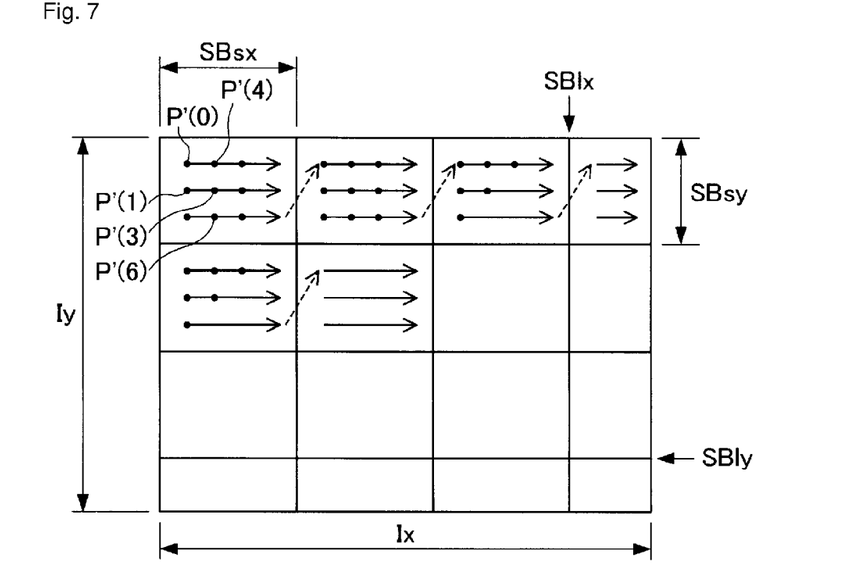
FIG. 7 is a diagram illustrating an outline of processing of rearranging macroblocks at random.
Figure 8:
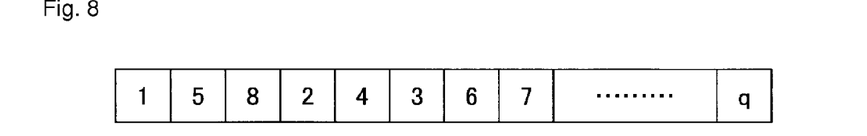
FIG. 8 is a diagram showing an example of a random number table which can be used when the macroblocks are rearranged.

So that the pack creation portion 4 (FIG. 1) can rearrange the order of the macroblocks at random, a random number table may be used, for example. FIG. 7 is a diagram illustrating an outline of the at-random rearrangement processing executed by the pack creation portion 4 (FIG. 1). FIG. 8 shows an example of the random number table that can be used for the rearrangement processing. In the random number table, arrangement of numerals in which numerals of the number of packs are arranged at random is noted. For example, supposing that the number of packs created by the pack creation portion 4 (FIG. 1) is q, arrangement of numerals in which the numerals of 1 to q are arranged at random is noted in the random number table. The pack creation portion 4 allocates the macroblocks to the packs with the number noted in the table in order from the first macroblock when the pack creation portion 4 extracts the macroblocks from the super block.

An example of the at-random rearrangement processing of the macroblocks will be described referring to FIGS. 7 and 8. First, since the numeral at the beginning of the random number table in FIG. 8 is 1, the first macroblock in the super block in FIG. 8 is allocated to the first pack, which is a pack P'(0). Subsequently, since the subsequent numeral in the random number table in FIG. 7 is 5, the second macroblock from the beginning in the super block in FIG. 8 is allocated to the second pack, which is a pack P'(4). Similarly, since the subsequent numeral in the random number table in FIG. 7 is 8, the third macroblock from the beginning of the super block in FIG. 8 is allocated to the third pack, which is a pack P'(7). In this way, each macroblock is allocated to one of the packs P'(0) to P'(q−1). When the allocation of the q pieces of the macroblocks is finished as above, the same processing is continued with the (q+1)-th macroblock as the first macroblock. In this way, the macroblocks on the entire image may be allocated so as to create the packs. The random number table is stored in memory, not shown. The memory may be included in the macroblock shuffling device 1 or may be provided outside the macroblock shuffling device 1.

Figure 9:
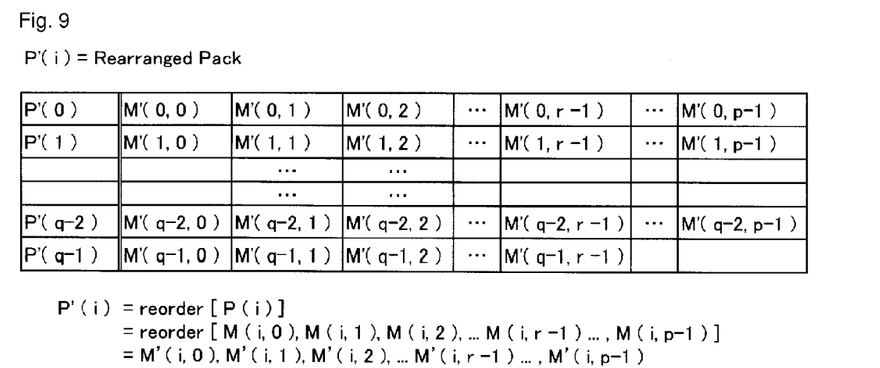
FIG. 9 is a diagram showing an example of packs created by rearranging the macroblocks in the processing shown in FIG. 7.

The packs rearranged as above are shown in FIG. 9. Supposing that the rearranged packs are P'(i) and the j-th macroblock contained in the rearranged i-th pack is M'(i, j), the rearrangement processing can be expressed as follows.

$$P'(i) = \text{reorder}[P(i)]$$
$$= \text{reorder}[M(i, 0), M(i, 1), M(i, 2), \ldots M(i, r-1) \ldots , M(i, p-1)]$$
$$= M'(i, 0), M'(i, 1), M'(i, 2), \ldots M'(i, r-1) \ldots , M'(i, p-1)$$

<Method using Function>

According to the present invention, the pack creation portion 4 (FIG. 1) may create the packs using a function. For example, the (x, y) coordinates of the super block in the image for extracting M(i, j) can be calculated as follows.

First, what number of macroblock M(i, j) from the first macroblock is calculated. A position a of M(i, j) counted from the first macroblock is calculated as follows. However, the following calculations are all made in integer values and fractions of divisions are rounded down.

$$a = i*p+j \quad \text{equation (1)}$$

From the above, the y coordinate of M(i, j) in the super block on the image and a position a' of M(i, j) in the super block from the left end can be expressed as follows.

$$y=(a/(Ix*SBsy))*SBsy$$

$$a'=a\%(Ix*SBsy) \quad \text{equation (2)}$$

Here, % indicates an operator for creating a remainder.

As has been described, since images of arbitrary sizes are to be handled, the numbers of the macroblocks contained at the left end and the lower end in the super block may be fractional. From the above, it is necessary to consider a case exceeding SB1y for y and a case exceeding SB1x for x separately.

If y<SB1y, $$x=(a/(SBsx*SBsy))*SBsx \text{ and}$$

$$a'=a\%(SBsx*SBsy). \quad \text{equation (3)}$$

If y=SB1y or y>SB1y, $$x=(a/(SBsx*(SBsx*(Iy-SBsy)))*SBsx \text{ and}$$

$$a'=a\%(SBsx*(Iy-SBsy)). \quad \text{equation (4)}$$

If x<SB1x, $$y=a'/SBsx \text{ and}$$

$$x=a'\% SBsx \quad \text{equation (5)}$$

If x=SB1x or x>SB1x, $$y=a'/(Ix-SB1x) \text{ and}$$

$$x=a'\%(Ix-SB1x) \quad \text{equation (6)}$$

EXAMPLE

As a specific example, supposing that Ix=8, Iy=5, SBsx=3, SBsy=2, SB1x=6, SB1y=4, p=6, q=7, a case is described in which the number of macroblocks in one pack is equal to the number in the super block as 6. In the case of this image, the number of macroblocks in one image is expressed as Ix*Iy=8*5=40. Therefore, since the number of macroblocks in one pack is expressed as 40/6=6 . . . 4 (remainder), 7 packs are needed and the number of macroblocks contained in the last pack is 4.

Figure 10:
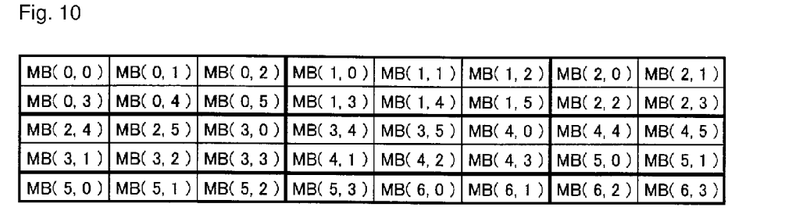
FIG. 10 is a diagram showing a specific example of processing of extracting the macroblocks for each super block and allocating thereof to the pack.

FIG. 10 is a diagram showing a state in which the above-mentioned image is divided into the super blocks, and the macroblocks are classified for each super block and allocated to the packs. In FIG. 10, a bold line indicates a boundary between the super blocks. As is evident from FIG. 10, all the macroblocks in the super block are evenly allocated to any of the packs P(0) to P(6). Only for the pack P(6), the number of macroblocks is 4.

Figure 11:
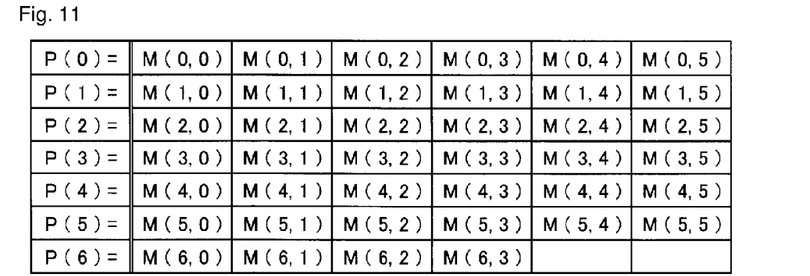
FIG. 11 is a diagram showing a specific example of the packs created from the super block shown in FIG. 10.

FIG. 11 shows the packs P(0) to P(6) created by the pack creation portion 4 by allocating the macroblocks. As is evident from FIG. 11, the packs P(0) to P(5) contain 6 macroblocks, while the pack P(6) contains 4 macroblocks.

Figure 12:
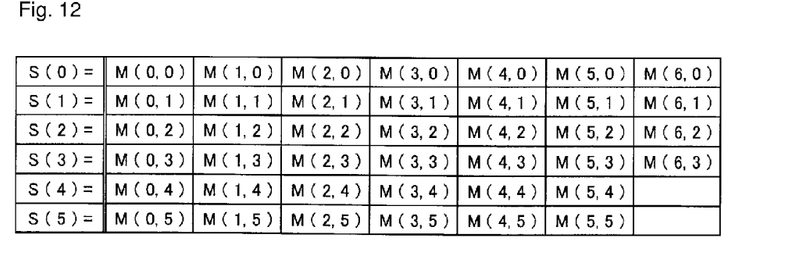
FIG. 12 is a diagram showing a specific example of slices created from the pack shown in FIG. 11.

FIG. 12 shows the slices S(0) to S(5) created by the slice creation portion 5 from the packs P(0) to P(6). As is evident from FIG. 12, the slice creation portion 5 extracts the macroblocks in the vertical direction in FIG. 11 from each of the packs P(1) to P(6) and allocates them so as to create the slices S(0) to S(5) in order. Therefore, the number of slices created by the slice creation portion 5 matches the maximum of the numbers of the macroblocks contained in each of the packs. The number of macroblocks contained in each of the packs created by the pack creation portion is 6 for the packs P(0) to P(q-2) and 5 for the pack P(6). Therefore, the number of slices created by the slice creation portion 5 is 6.

As described above, in the macroblock shuffling device of the present embodiment, the pack creation portion creates the packs having the macroblocks in either of the first predetermined number or the second predetermined number smaller than the first predetermined number. In more detail, the pack creation portion divides the total number of the macroblocks contained in the image data by the number of the packs and the quotient is made the first predetermined number, and in a case where there is a remainder, the remainder is made the second predetermined number and the packs are created so that only one pack has the second predetermined number of the macroblocks, while in a case where there is no remainder, the packs are created so that the second predetermined number becomes equal to the first predetermined number. Thus, even for an image of a size with which the macroblocks cannot be evenly allocated to the number of packs, the numbers of the macroblocks contained in the packs becomes equal except for one pack. The slice creation portion sequentially extracts the macroblocks one by one from each of the plurality of the packs created by the pack creation portion, creates the same number as the first predetermined number of the slices, each having the plurality of macroblocks, and the slice creation portion extracts the plurality of macroblocks contained in each of the slices from different packs. Thus, even for an image of a size with which the macroblocks cannot be evenly allocated to the number of packs, the difference in the numbers of the macroblocks contained in each of the plurality of the created slices is the difference in the number of macroblocks between the slice to which the second predetermined number of the macroblocks contained only in one pack are allocated and the slice not allocated, that is, only one. Therefore, the macroblock shuffling device according to the present invention can lower the correlation between the macroblocks by executing the shuffling substantially evenly even for an image of arbitrary size. In addition, if the correlation between the macroblocks is lowered by the shuffling, since the quantization value between the slices gets close, such an effect can be expected that a speed of quantization can be raised and quality per a single image can be made consistent.

Although an embodiment of the present invention has been described as above, the present invention is not limited to the above-mentioned embodiment. In addition, the effects described in the embodiment of the present invention are merely the most suitable effects realized by the present invention, and the effects of the present invention are not limited to those described in the embodiment of the present invention.

For example, the video shuffling device according to the present invention can be applied not only to a unique codec for editing, but also various types of video compression including DV standard, intra-frame compression as well as inter-frame compression.

Moreover, the macroblock shuffling device according to the present invention can be operated by a macroblock shuffling program including a CPU and memory for having a general-purpose computer function as the above-mentioned means. The macroblock shuffling program can be distributed through a communication line and also can be written in a recording medium such as CD-ROM and distributed.

The invention claimed is:

1. A macroblock shuffling device constituting an image coding device for coding image data, comprising:
   a superblock dividing portion for inputting an image data constituted in the form of a plurality of macroblocks, and dividing and arranging the plurality of macroblocks into a plurality of superblocks, wherein each macroblock is arranged in only one superblock;
   a pack creation portion that sequentially extracts the macroblocks from each superblock and rearranges the extracted macroblocks and creates pieces of a plurality of packs, each having a first predetermined number of macroblocks or a second predetermined number of macroblocks that is smaller than the first predetermined number of macroblocks; and
   a slice creation portion that extracts macroblocks one by one in order from each of the plurality of packs created by the pack creation portion and creates the same number of slices as the first predetermined number of macroblocks, each slice having a plurality of macroblocks,
   wherein the pack creation portion divides the total of the macroblocks contained in the image data by the number of packs so as to make a quotient thereof the first predetermined number of macroblocks, and in a case where there is no remainder, the pieces of the plurality of packs are created so that the second predetermined number becomes equal to the first predetermined number, while in a case where there is a remainder, the remainder is made the second predetermined number, and the of pieces of the plurality of packs are created so that only one pack has the second predetermined number of macroblocks, and
   the slice creation portion extracts the plurality of macroblocks contained in each of the slices from different packs, respectively.

2. A macroblock shuffling device as set forth in claim 1, wherein the pack creation portion switches the order of the macroblocks at random when the macroblock is extracted for each of the super blocks.

3. A macroblock shuffling device as set forth in claim 1, further comprises a super-block dividing portion that divides a screen on which a plurality of macroblocks constituting the image data into a plurality of super blocks and classifies the plurality of macroblocks for each super block, wherein the pack creation portion extracts a macroblock for each of the super blocks according to a predetermined function and sequentially allocates the macroblock to each of the plurality of packs.

4. A macroblock shuffling device as set forth in claim 3, wherein the pack creation portion switches the order of the macroblocks at random when the macroblock is extracted for each of the super blocks.

5. A macroblock shuffling device as set forth in claim 3, wherein the plurality of super blocks divided by the super-block dividing portion are represented in a rectangular form, respectively, and made up of a first super-block group of super-blocks equal to one another in the number of vertically arranged macroblocks and the number of horizontally arranged macroblocks;
   a second super-block group of super-blocks respectively equal to the super-blocks of the first super-block group in the number of vertically arranged macro blocks but different from the super-blocks of the first super-block group in the number of horizontally arranged macroblocks;
   a third super-block group of super-blocks respectively equal to the super-blocks of the first super-block group in the number of horizontally arranged macroblocks but different from the super-blocks of the first super-block group in the number of vertically arranged macroblocks; and
   a fourth super-block group of super-blocks respectively equal to the super-blocks of the second super-block group in the number of horizontally arranged macroblocks and equal to the super-blocks of the third super-block group in the number of vertically arranged macroblocks, wherein
   the pack creation portion extracts a macroblock for each of the super blocks horizontally from above in order and sequentially allocate the macroblock to each one of the plurality of packs.

6. A macroblock shuffling method constituting an image coding process for coding image data, comprising:
   superblock dividing step for inputting an image data constituted in the form of a plurality of macroblocks, and dividing and arranging the plurality of macroblocks into a plurality of superblocks, wherein each macroblock is arranged in only one superblock;
   a pack creation step of sequentially extracting the macroblocks from each superblock and rearranging the extracted macroblocks undoreating pieces of a plurality of packs, each having a first predetermined number of or a second predetemined number of macroblocks that is smaller than the first predetermined number of macroblocks; and
   a slice creation step of extracting macroblocks one by one in order from each of the plurality of packs created by the pack creation step and creating the same number of slices as the first predetermined number of macroblocks, each slice having a plurality of macroblocks,
   wherein, the pack creation step has a step of dividing the total number of the macroblocks contained in the image data by the number of packs so as to make a quotient thereof the first predetermined number of macroblocks, and in a case where there is no remainder, the pieces of the plurality of packs are created so that the second predetermined number becomes equal to the first predetermined number, while in a case where there is a remainder, the remainder is made the second predetermined number, and the pieces of the plurality of packs are created so that only one pack has the second predetermined number of macroblocks, and the slice creation step has a step of extracting the plurality of macroblocks contained in each of the slices from different packs, respectively.

7. A computer program product comprising a non-transitory computer readable medium for macroblock shuffling, the computer program product comprising code executable by a computer to carry out a macroblock shuffling process constituting an image coding process for coding image data, the macroblock shuffling process comprising:
  a superblock dividing step for inputting an image data constituted in the form of a plurality of macroblocks, and dividing and arranging the plurality of macroblocks into a plurality of superblocks, wherein each macroblock is arranged in only one superblock;
  a pack creation step of sequentially extracting the macroblocks from each superblock and rearranging the extracted macroblocks and creating a plurality of packs, each having a first predetermined number of macroblocks or a second predetermined number of macroblocks that is smaller than the first predetermined number of macroblocks; and
  a slice creation step of extracting macroblocks one by one in order from each of the plurality of packs created by the pack creation step and creating the same number of slices as the first predetermined number of macroblocks, each slice having a plurality of macroblocks,
  wherein, the pack creation step has a step of dividing the total number of the macroblocks contained in the image data by the number of packs so as to make a quotient thereof the first predetermined number of macroblocks, and in a case where there is no remainder, the pieces of the plurality of packs are created so that the second predetermined number becomes equal to the first predetermined number, while in a case where there is a remainder, the remainder is made the second predetermined number, and the pieces of the plurality of packs are created so that only one pack has the second predetermined number of macroblocks, and
  the slice creation step has a step of extracting the plurality of macrobiocks contained in each of the slices from different packs, respectively.

8. The method of claim 6, wherein the pack creation step includes switching the order of the macroblocks at random when the macroblock is extracted for each of the super blocks.

9. The method of claim 6,
  wherein the super-block dividing step divides a screen on which a plurality of macroblocks constituting the image data into a plurality of super blocks and classifies the plurality of macroblocks for each super block, and
  the pack creation step extracts a macroblock for each of the super blocks according to a predetermined function and sequentially allocates the macroblock to each of the plurality of packs.

10. The method of claim 9, wherein the pack creation step switches the order of the macroblocks at random when the macroblock is extracted for each of the super blocks.

11. The method of claim 9, wherein the plurality of super blocks divided by the super-block dividing step are represented in a rectangular form, respectively, and made up of a first super-block group of super-blocks equal to one another in the number of vertically arranged macroblocks and the number of horizontally arranged macroblocks;
  a second super-block group of super-blocks respectively equal to the super-blocks of the first super-block group in the number of vertically arranged macroblocks but different from the super-blocks of the first super-block group in the number of horizontally arranged macroblocks;
  a third super-block group of super-blocks respectively equal to the super-blocks of the first super-block group in the number of horizontally arranged macroblocks but different from the super-blocks of the first super-block group in the number of vertically arranged macroblocks; and
  a fourth super-block group of super-blocks respectively equal to the super-blocks of the second super-block group in the number of horizontally arranged macroblocks and equal to the super-blocks of the third super-block group in the number of vertically arranged macroblocks, wherein
  the pack creation step extracts a macroblock for each of the super blocks horizontally from above in order and sequentially allocate the macroblock to each one of the plurality of packs.

12. The computer program product of claim 7, wherein the pack creation step includes switching the order of the macroblocks at random when the macroblock is extracted for each of the super blocks.

13. The computer program product of claim 7,
  wherein the super-block dividing step divides a screen on which a plurality of macroblocks constituting the image data into a plurality of super blocks and classifies the plurality of macroblocks for each super block, and
  the pack creation step extracts a macroblock for each of the super blocks according to a predetermined function and sequentially allocates the macroblock to each of the plurality of packs.

14. The computer program product of claim 13, wherein the pack creation step switches the order of the macroblocks at random when the macroblock is extracted for each of the super blocks.

15. The computer program product of claim 13, wherein the plurality of super blocks divided by the super-block dividing step are represented in a rectangular form, respectively, and made up of a first super-block group of super-blocks equal to one another in the number of vertically arranged macroblocks and the number of horizontally arranged macroblocks;
  a second super-block group of super-blocks respectively equal to the super-blocks of the first super-block group in the number of vertically arranged macroblocks but different from the super-blocks of the first super-block group in the number of horizontally arranged macroblocks;
  a third super-block group of super-blocks respectively equal to the super-blocks of the first super-block group in the number of horizontally arranged macroblocks but different from the super-blocks of the first super-block group in the number of vertically arranged macroblocks; and
  a fourth super-block group of super-blocks respectively equal to the super-blocks of the second super-block group in the number of horizontally arranged macroblocks and equal to the super-blocks of the third super-block group in the number of vertically arranged macroblocks, wherein
  the pack creation step extracts a macroblock for each of the super blocks horizontally from above in order and sequentially allocate the macroblock to each one of the plurality of packs.

* * * * *